United States Patent
Takeuchi et al.

(10) Patent No.: US 11,281,188 B2
(45) Date of Patent: Mar. 22, 2022

(54) CONTROLLER FOR MACHINING DEVICE AND CONTROL METHOD FOR MACHINING DEVICE

(71) Applicant: FANUC CORPORATION, Yamanashi (JP)

(72) Inventors: Naoya Takeuchi, Yamanashi (JP); Tetsushi Takahara, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 59 days.

(21) Appl. No.: 17/014,102

(22) Filed: Sep. 8, 2020

(65) Prior Publication Data
US 2021/0132589 A1 May 6, 2021

(30) Foreign Application Priority Data

Nov. 6, 2019 (JP) .............................. JP2019-201367

(51) Int. Cl.
*G05B 19/4155* (2006.01)
(52) U.S. Cl.
CPC ..................... *G05B 19/4155* (2013.01); *G05B 2219/36089* (2013.01)
(58) Field of Classification Search
None
See application file for complete search history.

(56) References Cited

U.S. PATENT DOCUMENTS

| 4,985,841 A | * | 1/1991 | Iwagaya | B23G 1/16 408/11 |
| 5,165,828 A | * | 11/1992 | Green | G05B 19/186 318/39 |
| 5,307,549 A | * | 5/1994 | Tsutsumi | G05B 19/186 29/27 C |

(Continued)

FOREIGN PATENT DOCUMENTS

| EP | 0801339 A1 | 10/1997 |
| JP | H09-120310 A | 5/1997 |

(Continued)

OTHER PUBLICATIONS

Takeuchi, Naoya, et al.; "Machine Tool and Control Method of Machine Tool"; U.S. Appl. No. 16/901,142, filed Jun. 15, 2020; 39 pages.

*Primary Examiner* — Ryan A Jarrett

(57) ABSTRACT

A controller for a machining-device includes a control-unit. The control-unit sequentially repeats a tapping step of tapping at a tapping-position by moving a tool from a retracted-position to a depth-position while rotating the tool in a normal direction, a retracting step of retracting the tool by moving from the depth-position to the retracted-position while rotating the tool in a reverse direction, and a positioning step of positioning a subsequent tapping-position. The control-unit performs a process including starting the positioning step at the same time as when the tool passes a reference-position in the retracting step, completing the positioning step at the same time as when the tool passes the (Continued)

reference-position in the tapping step, and controlling a timing at which acceleration of a workpiece and the tool finishes in the tapping step and a timing at which deceleration of the workpiece and the tool starts in the retracting step.

7 Claims, 9 Drawing Sheets

(56) References Cited

U.S. PATENT DOCUMENTS

| | | | |
|---|---|---|---|
| 5,888,037 A | 3/1999 | Fujimoto et al. | |
| 2001/0015116 A1* | 8/2001 | Kakino | B23G 1/16 82/1.11 |
| 2021/0003987 A1* | 1/2021 | Takeuchi | G05B 19/4166 |

FOREIGN PATENT DOCUMENTS

| | | |
|---|---|---|
| JP | 2011-073069 A | 4/2011 |
| JP | 2015-187799 A | 10/2015 |

\* cited by examiner

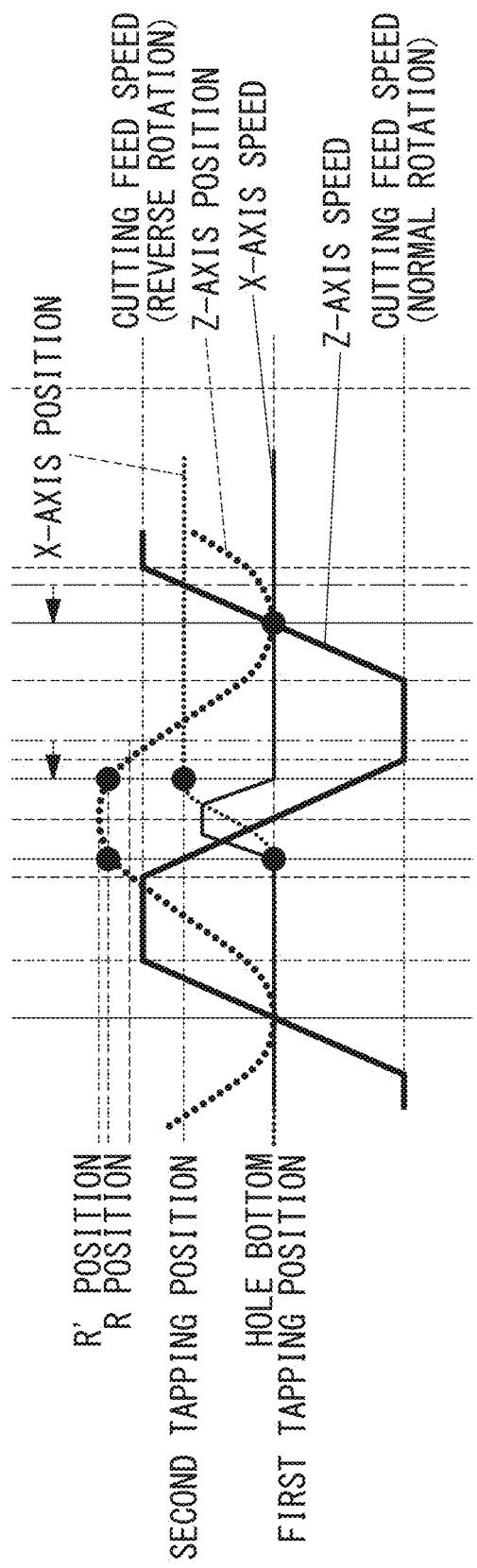

CONTROLLER FOR MACHINING DEVICE AND CONTROL METHOD FOR MACHINING DEVICE

CROSS-REFERENCE TO RELATED APPLICATIONS

This application is based on Japanese Patent Application No. 2019-201367, the contents of which are incorporated herein by reference.

TECHNICAL FIELD

The present invention relates to controllers for machining devices and to control methods for machining devices.

BACKGROUND ART

A known machining device in the related art performs tapping on a workpiece (e.g., see Patent Literature 1 to Patent Literature 3). Patent Literature 3 discloses a control method for a machining device that can shorten the cycle time of tapping by moving a tool to a workpiece along a smooth continuous path.

CITATION LIST

Patent Literature

{PTL 1}
Japanese Unexamined Patent Application, Publication No. 2015-187799
{PTL 2}
Japanese Unexamined Patent Application, Publication No. 2011-073069
{PTL 3}
Japanese Unexamined Patent Application, Publication No. Hei 09-120310

SUMMARY OF INVENTION

An aspect of the present disclosure provides a controller for a machining device. The machining device includes a table that holds a workpiece, a main shaft that holds a tapping tool, a first feed motor that relatively moves the table and the main shaft in a first direction parallel to a longitudinal axis of the main shaft, a second feed motor that relatively moves the table and the main shaft in a second direction intersecting the longitudinal axis, and a main shaft motor that rotates the main shaft around the longitudinal axis. The controller includes a control unit that controls the first feed motor to move a distal end of the tool between a retracted position where the distal end of the tool is retracted from the workpiece and a predetermined depth position in the workpiece, controls the second feed motor to position each of a plurality of tapping positions of the workpiece relative to the tool, and controls the main shaft motor to control rotation of the tool. The control unit sequentially repeats a tapping step of performing tapping at one of the tapping positions by moving the distal end of the tool from the retracted position to the predetermined depth position while rotating the tool in a normal direction, a retracting step of retracting the tool from the workpiece by moving the distal end of the tool from the predetermined depth position to the retracted position without stopping while rotating the tool in a reverse direction, and a positioning step of positioning a subsequent one of the tapping positions relative to the tool and switching a rotational direction of the tool from the reverse direction to the normal direction. The control unit further performs a process including starting relative movement of the workpiece and the tool in the positioning step at the same time as when the distal end of the tool passes a reference position between the workpiece and the retracted position in the retracting step, completing the relative movement of the workpiece and the tool in the positioning step at the same time as when the distal end of the tool passes the reference position in the tapping step, and controlling a timing at which acceleration of the relative movement of the workpiece and the tool finishes in the tapping step and a timing at which deceleration of the relative movement of the workpiece and the tool starts in the retracting step based on a distance from the one tapping position to the subsequent tapping position in the second direction.

BRIEF DESCRIPTION OF DRAWINGS

FIG. 9 is a graph illustrating temporal changes in the speed and position of the main shaft (Z axis) and the table (X axis) in another comparative example.

DESCRIPTION OF EMBODIMENTS

A machining device 1 according to an embodiment will be described below with reference to the drawings.

The machining device 1 is, for example, a machining center including a tool magazine that accommodates a plurality of tools and a main shaft that holds one of the tools, and has a function of automatically exchanging tools between the tool magazine and the main shaft.

Figure 1:
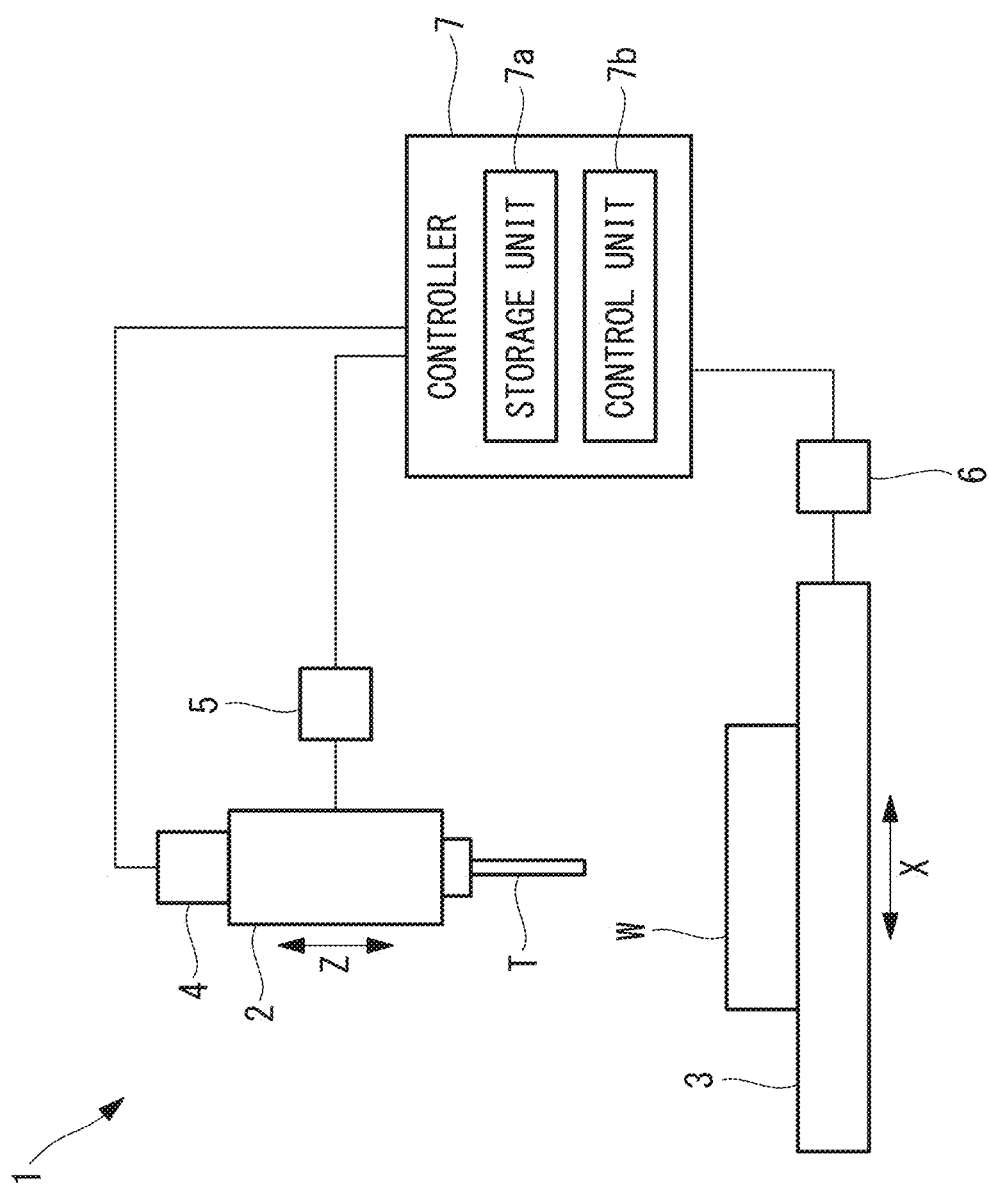
FIG. 1 schematically illustrates the configuration of a machining device according to an embodiment.

As shown in FIG. 1, the machining device 1 includes a main shaft 2 that holds a tool T, a table 3 that holds a workpiece W, a main shaft motor 4 that rotates the main shaft 2 around the longitudinal axis of the main shaft 2, a Z-axis feed motor (first feed motor) 5 that moves the main shaft 2 relative to the table 3 in a Z direction (first direction), an X-axis feed motor (second feed motor) 6 that moves the table 3 relative to the main shaft 2 in an X direction (second direction), and a controller 7 that controls the motors 4, 5, and 6.

The Z direction is parallel to the longitudinal axis of the main shaft 2, and the X direction is orthogonal to the longitudinal direction of the main shaft 2.

Figure 2:
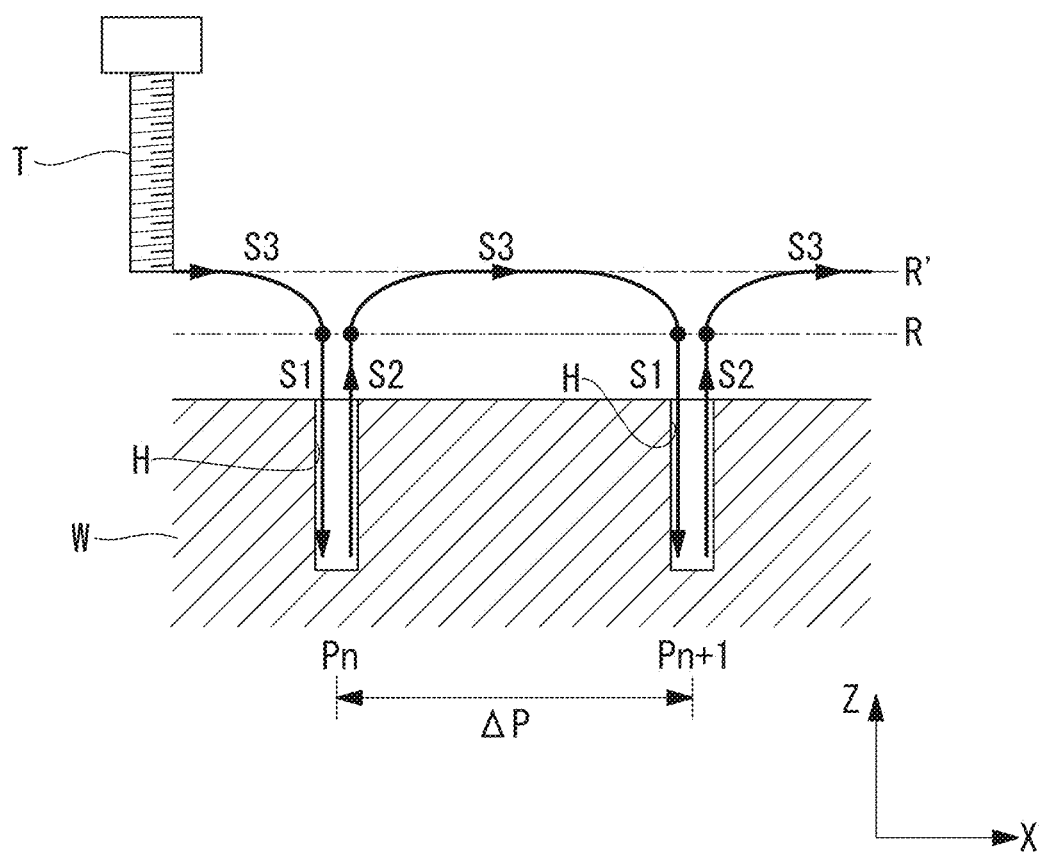
FIG. 2 illustrates relative movement between a workpiece and a tool in accordance with a control method for a machining device according to an embodiment.

The main shaft 2 is disposed in the vertical direction and is supported in a movable manner in the vertical direction by a support mechanism (not shown). Therefore, in the machining device 1 in FIG. 1, the Z direction is the vertical direction, whereas the X direction is the horizontal direction. The lower end of the main shaft 2 holds the tool T. As shown in FIG. 2, the tool T is a tapping tool used for creating a screw thread in a pilot hole H formed in the workpiece W. The tool T is coaxial with the main shaft 2 and moves by rotating together with the main shaft 2.

The table 3 is disposed horizontally below the main shaft 2. The workpiece W placed on the upper surface of the table 3 is fixed to the table 3 by using a jig (not shown).

The main shaft motor 4 is a spindle motor connected to the upper end of the main shaft 2.

The Z-axis feed motor 5 and the X-axis feed motor 6 are servomotors. A Y-axis feed motor for moving the table 3 in a Y direction may further be provided. The Y direction is a horizontal direction orthogonal to the Z direction and the X direction.

The controller 7 is, for example, a numerical controller. The controller 7 has a storage unit 7a and a control unit 7b.

The storage unit 7a has, for example, a random access memory (RAM), a read only memory (ROM), and other storage devices. As shown in FIG. 2, the storage unit 7a stores therein a machining program for performing tapping sequentially in pilot holes H located at a plurality of tapping positions Pi (i=1, 2, . . . , n, n+1, . . . ) of the workpiece W. The tapping positions Pi are arranged in the X direction while being separated from each other by a distance ΔP.

The control unit 7b has a processor, such as a central processing unit. The control unit 7b transmits control commands to the motors 4, 5, and 6 in accordance with the machining program, so as to control the operation of the main shaft 2 and the table 3, whereby tapping is performed sequentially in the pilot holes H at the plurality of tapping positions Pi by using the tool T.

In detail, the control unit 7b controls the main shaft motor 4, so as to control the rotational direction and the rotational speed of the main shaft 2 and the tool T.

The control unit 7b controls the Z-axis feed motor 5 to cause the main shaft 2 to descend and ascend repeatedly in the Z direction, such that the distal end of the tool T moves back and forth between a predetermined R' position (retracted position) and a predetermined depth position in the workpiece W corresponding to the bottom of each pilot hole H. The R' position is located above the upper surface of the workpiece W and is where the distal end of the tool T is retracted after tapping is performed at each tapping position Pi.

The control unit 7b controls the X-axis feed motor 6 to repeatedly cause the table 3 to move in the X direction and temporarily stop, such that each of the plurality of tapping positions Pi is positioned vertically below the tool T.

Next, a method of how the motors 4, 5, and 6 are controlled by the control unit 7b in accordance with the machining program will be described in detail.

As shown in FIG. 2, the control unit 7b sequentially repeats a tapping step S1, a retracting step S2, and a positioning step S3. In FIG. 2, a path of relative movement between the tool T and the workpiece W during a first control mode, to be described later, is illustrated.

In the tapping step S1, the control unit 7b causes the main shaft 2 to descend while rotating the main shaft 2 in the normal direction in a state where a tapping position Pn is positioned in the X direction relative to the tool T, thereby causing the distal end of the tool T rotating in the normal direction to descend from the R' position to the predetermined depth direction. Consequently, tapping is performed in the pilot hole H at the tapping position Pn.

In this case, at the same time as when the distal end of the tool T starts to move from the R' position, the control unit 7b causes the main shaft 2 to start accelerating in the Z direction so that the main shaft 2 accelerates to a cutting feed speed. Then, the control unit 7b causes the main shaft 2 to descend at the cutting feed speed, and subsequently causes the main shaft 2 to decelerate from the cutting feed speed in the Z direction so that the speed in the Z direction at the distal end of the tool T reaches zero at the predetermined depth position. The cutting feed speed is set in accordance with the rotational speed of the main shaft 2 and the pitch of the tool T. For example, the cutting feed speed corresponds to the maximum rotational speed of the main shaft 2.

The control unit 7b increases the rotational speed of the main shaft 2 in synchronization with the acceleration of the main shaft 2 in the Z direction, and decreases the rotational speed of the main shaft 2 in synchronization with the deceleration of the main shaft 2 in the Z direction.

Subsequently, in the retracting step S2, the control unit 7b causes the main shaft 2 to stop rotating when the distal end of the tool T reaches the predetermined depth position, and then rotates the main shaft 2 in the reverse direction. Subsequently, the control unit 7b causes the main shaft 2 to ascend while rotating the main shaft 2 in the reverse direction, and causes the distal end of the tool T to ascend from the predetermined depth position to an R position without ever causing the tool T to stop moving in the Z direction. Consequently, the tool T is removed from the pilot hole H and is retracted to a height where the distal end of the tool T does not interfere with the workpiece W.

In this case, at the same time as when the distal end of the tool T starts to move from the predetermined depth position, the control unit 7b causes the main shaft 2 to start accelerating in the Z direction so that the main shaft 2 accelerates to the cutting feed speed. Then, the control unit 7b causes the main shaft 2 to ascend at the cutting feed speed, and subsequently causes the main shaft 2 to decelerate from the cutting feed speed in the Z direction so that the speed in the Z direction at the distal end of the tool T reaches zero at the R' position.

The control unit 7b increases the rotational speed of the main shaft 2 in synchronization with the acceleration of the main shaft 2 in the Z direction, and decreases the rotational speed of the main shaft 2 in synchronization with the deceleration of the main shaft 2 in the Z direction.

Subsequently, in the positioning step S3, the control unit 7b moves the table 3 in a quick feed mode in the X direction, so as to position a subsequent tapping position Pn+1 vertically below the tool T. The control unit 7b switches the rotational direction of the main shaft 2 from the reverse direction to the normal direction.

In the quick feed mode, the X-axis feed motor 6 moves the table 3 in the X direction at a quick feed speed. The quick feed speed is the maximum speed of the table 3 achievable by the X-axis feed motor 6. In the quick feed mode, the X-axis feed motor 6 causes the table 3 to accelerate to the quick feed speed in accordance with a maximum acceleration rate of the X-axis feed motor 6, and causes the table 3 to decelerate from the quick feed speed in accordance with a maximum deceleration rate of the X-axis feed motor 6.

The control unit 7b starts the positioning step S3 before the end of the retracting step S2.

In detail, at the same time as when the distal end of the tool T ascending in the retracting step S2 passes a predetermined R position (reference position), the control unit 7b causes the table 3 to start moving in the positioning step S3. The R position is located between the upper surface of the workpiece W and the R' position and is located above the upper surface of the workpiece W. For example, the distance between the upper surface of the workpiece W and the R position in the Z direction ranges between 1 mm and 5 mm. Accordingly, the movement of the main shaft 2 in the Z direction and the movement of the table 3 in the X direction temporally overlap each other until the distal end of the tool T reaches the R' position from the R position, and the path along which the distal end of the tool T moves relative to the workpiece W from the R position to the R' position becomes circular-arc-shaped or substantially circular-arc-shaped.

The control unit 7b starts the subsequent tapping step S1 before the end of the positioning step S3.

In detail, the control unit 7b causes the tool T to start descending such that the positioning of the tapping position Pn+1 in the positioning step S3 is completed at the same time as when the distal end of the tool T descending in the subsequent tapping step S1 passes the R position. Accordingly, the movement of the table 3 in the X direction and the movement of the main shaft 2 in the Z direction temporally overlap each other until the distal end of the tool T reaches the R position from the R' position, and the path along which the distal end of the tool T moves relative to the workpiece W from the R' position to the R position becomes circular-arc-shaped or substantially circular-arc-shaped.

The control unit 7b controls the rotational direction of the main shaft 2 in the positioning step S3 such that the distal end of the tool T passes the R position while the tool T rotates in the normal direction in the tapping step S1.

Figure 3:
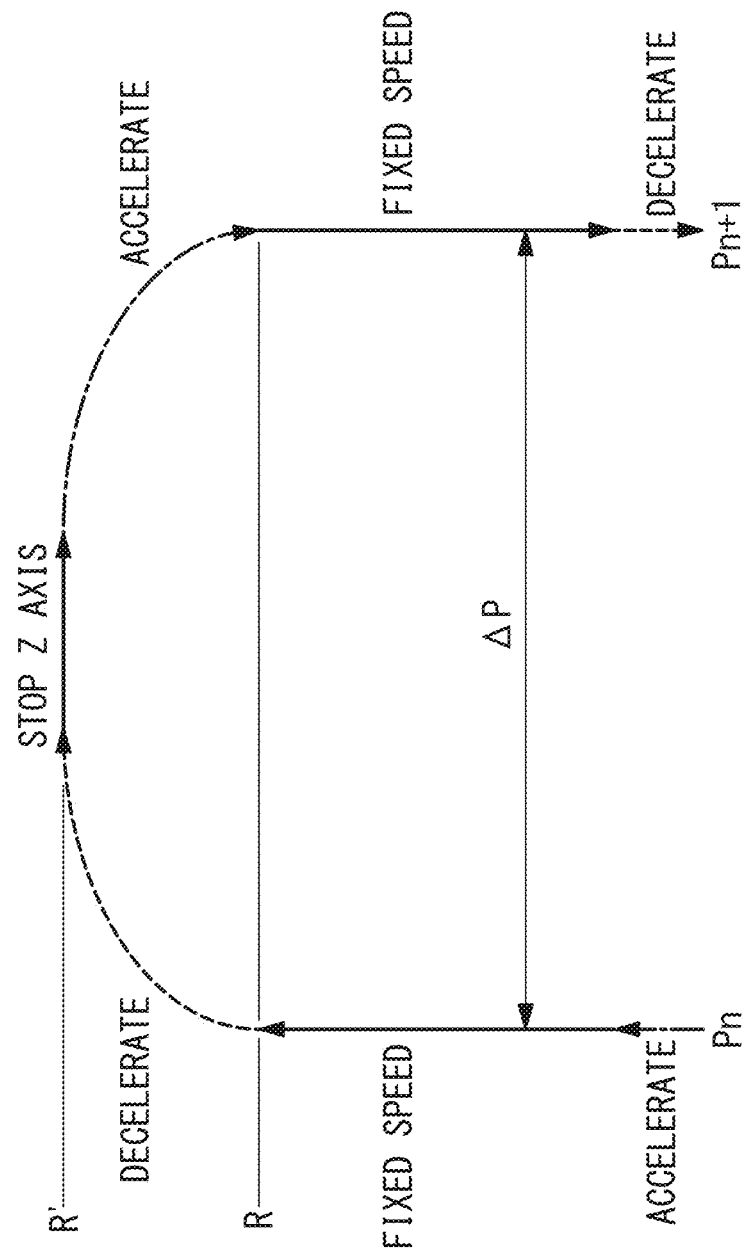
FIG. 3 illustrates the movement path of the tool relative to the workpiece and the moving speed of the tool in a first control mode.
Figure 4:
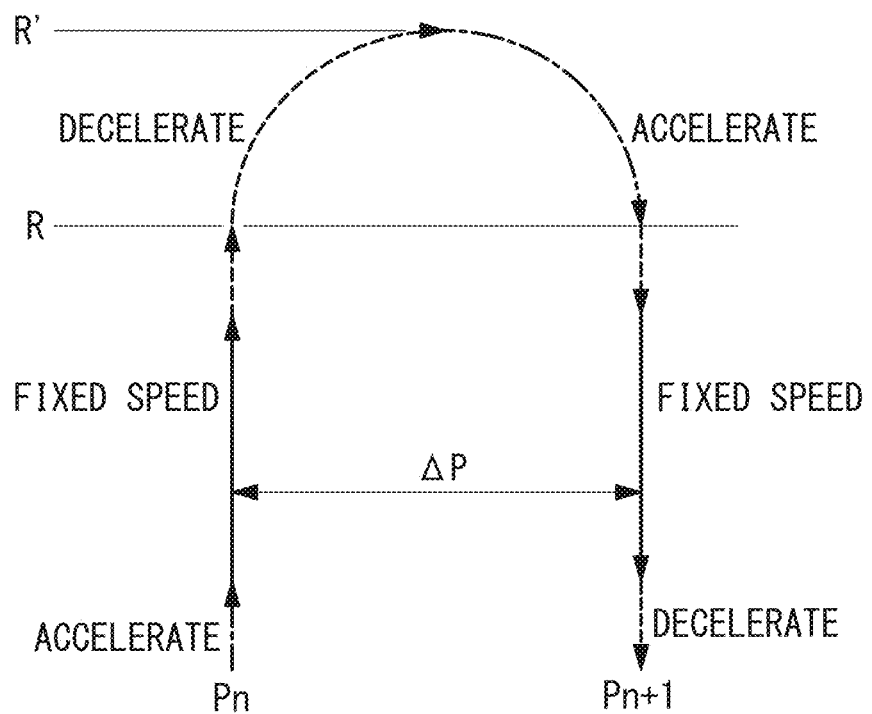
FIG. 4 illustrates the movement path of the tool relative to the workpiece and the moving speed of the tool in a second control mode.

As shown in FIGS. 3 and 4, the control unit 7b controls the timing at which the main shaft 2 finishes accelerating in the Z direction in the tapping step S1 and the timing at which the main shaft 2 starts decelerating in the Z direction in the retracting step S2 in accordance with either one of a first control mode and a second control mode based on the distance ΔP between the tapping positions Pn and Pn+1 in the X direction. By using the control modes according to the distance ΔP in this manner, the aforementioned circular-arc-shaped or substantially circular-arc-shaped movement path can be achieved regardless of the distance ΔP.

For example, the selection of either one of the first control mode and the second control mode is performed automatically by the control unit 7b based on the machining program or is performed by a user, and the selected control mode is set in the controller 7.

In FIGS. 3 and 4, a solid arrow denotes a movement path of the tool T at a fixed cutting feed speed, a dashed arrow denotes a movement path of the tool T during deceleration, and a single-dot chain arrow denotes a movement path of the tool T during acceleration.

Figure 5:
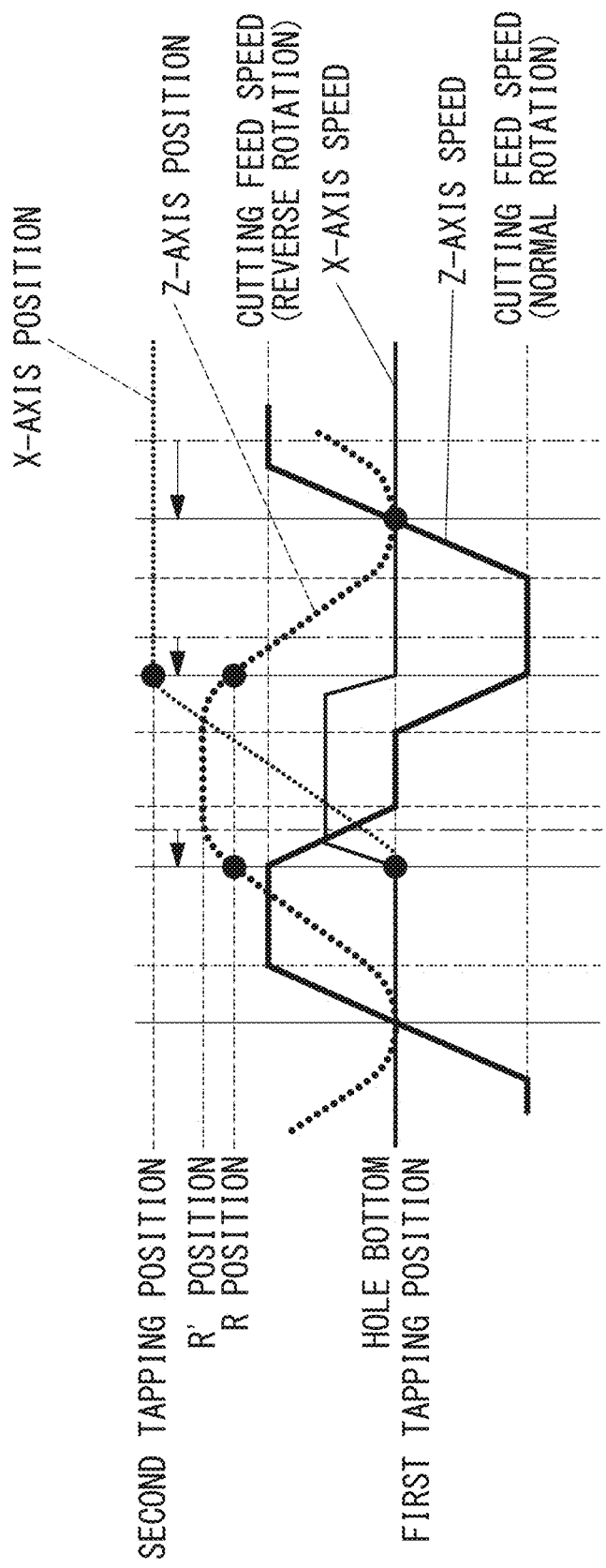
FIG. 5 is a graph illustrating temporal changes in the speed and position of a main shaft (Z axis) and a table (X axis) in the first control mode.
Figure 6:
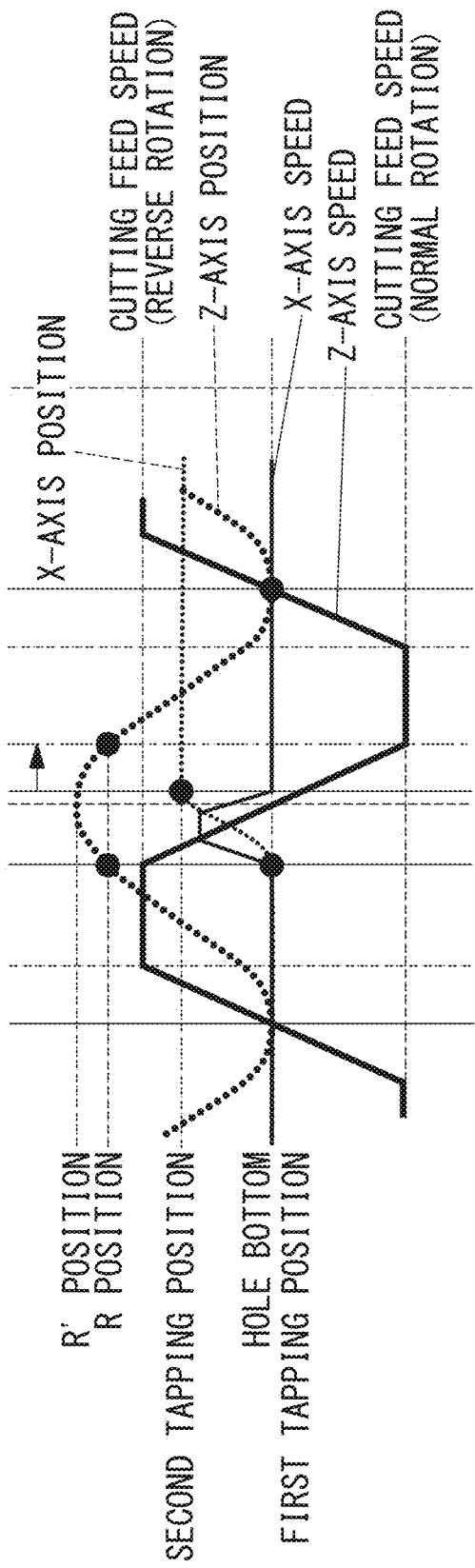
FIG. 6 is a graph illustrating temporal changes in the speed and position of the main shaft (Z axis) and the table (X axis) in the second control mode.

FIG. 5 illustrates temporal changes in the speed and position of the main shaft 2 (Z axis) and the table 3 (X axis) in the first control mode. FIG. 6 illustrates temporal changes in the speed and position of the main shaft 2 (Z axis) and the table 3 (X axis) in the second control mode. In FIGS. 5 and 6, the abscissa axis denotes time.

As shown in FIG. 3, the first control mode is selected when the distance ΔP between the tapping positions Pn and Pn+1 is relatively large. In detail, the first control mode is selected when the total of the length of the acceleration period of the main shaft 2 in the Z direction in the tapping step S1 and the length of the deceleration period of the main shaft 2 in the Z direction in the retracting step S2 is smaller than or equal to the length of the positioning period in the positioning step S3.

The deceleration period of the main shaft 2 in the Z direction is the time required for the speed of the main shaft 2 to decrease at a predetermined deceleration rate from the cutting feed speed to zero. The predetermined deceleration rate is, for example, a maximum deceleration rate of the Z-axis feed motor 5. The acceleration period of the main shaft 2 in the Z direction is the time required for the speed of the main shaft 2 to increase at a predetermined acceleration rate from zero to the cutting feed speed. The predetermined acceleration rate is, for example, a maximum acceleration rate of the Z-axis feed motor 5.

The length of the positioning period is the length of a time period from when the table 3 starts moving to when the table 3 stops after the subsequent tapping position Pn+1 is positioned relative to the tool T in the positioning step S3.

In the retracting step S2 in the first control mode, the control unit 7b causes the main shaft 2 to start decelerating in the Z direction at the same time as when the distal end of the tool T passes the R position. In the tapping step S1, the control unit 7b causes the main shaft 2 to finish accelerating in the Z direction at the same time as when the distal end of the tool T passes the R position.

As shown in FIG. 4, the second control mode is selected when the distance ΔP between the tapping positions Pn and Pn+1 is relatively small. In detail, the second control mode is selected when the total of the length of the acceleration period of the main shaft 2 in the Z direction in the tapping step S1 and the length of the deceleration period of the main shaft 2 in the Z direction in the retracting step S2 is greater than the length of the positioning period in the positioning step S3.

In the retracting step S2 in the second control mode, the control unit 7b causes the main shaft 2 to start decelerating in the Z direction before the distal end of the tool T passes the R position. In the tapping step S1, the control unit 7b causes the main shaft 2 to finish accelerating in the Z direction after the distal end of the tool T passes the R position. The timing at which deceleration starts becomes earlier with decreasing distance ΔP. Preferably, the control unit 7b controls the timing at which the main shaft 2 starts decelerating in the retracting step S2 such that the length of a time period from when the distal end of the tool T passes the R position in the retracting step S2 to when the distal end of the tool T passes the R position in the subsequent tapping step S1 is equal to the length of the positioning period.

Next, the operation of the machining device 1 will be described.

The control unit 7b repeatedly causes the X-axis feed motor 6 to move the table 3 in the X direction and to temporarily stop the table 3, thereby sequentially positioning the plurality of tapping positions Pi of the workpiece W vertically below the tool T. While causing the main shaft motor 4 to rotate the main shaft 2 and the tool T, the control unit 7b causes the main shaft 2 to repeatedly descend and ascend in the Z direction by using the Z-axis feed motor 5 in synchronization with the movement of the table 3. Consequently, tapping is performed sequentially in pilot holes H at the plurality of tapping positions Pi by using the tool T.

During the period in which the distal end of the tool T moves in the Z direction between the R' position and the R position, the movement of the main shaft 2 in the Z direction and the movement of the table 3 in the X direction temporally overlap each other. Accordingly, the cycle time can be shorted, as compared with a case where the subsequent positioning step S3 is started after the retracting step S2 is completely finished and the subsequent tapping step S1 is started after the positioning step S3 is completely finished.

The timing at which the ascending main shaft 2 decelerates and the timing at which the descending main shaft 2 finishes accelerating are controlled based on the control modes according to the distance ΔP between the tapping positions Pn and Pn+1. By performing such control, the movement path of the tool T relative to the workpiece W from the tapping position Pn to the tapping position Pn+1 extends continuously and smoothly, that is, the tool T moves relative to the workpiece W from the tapping position Pn to the tapping position Pn+1 without temporarily stopping, regardless of the distance ΔP. Accordingly, the table 3 can be moved constantly in a quick feed mode regardless of the distance ΔP, thereby further shortening the cycle time.

Figure 8:
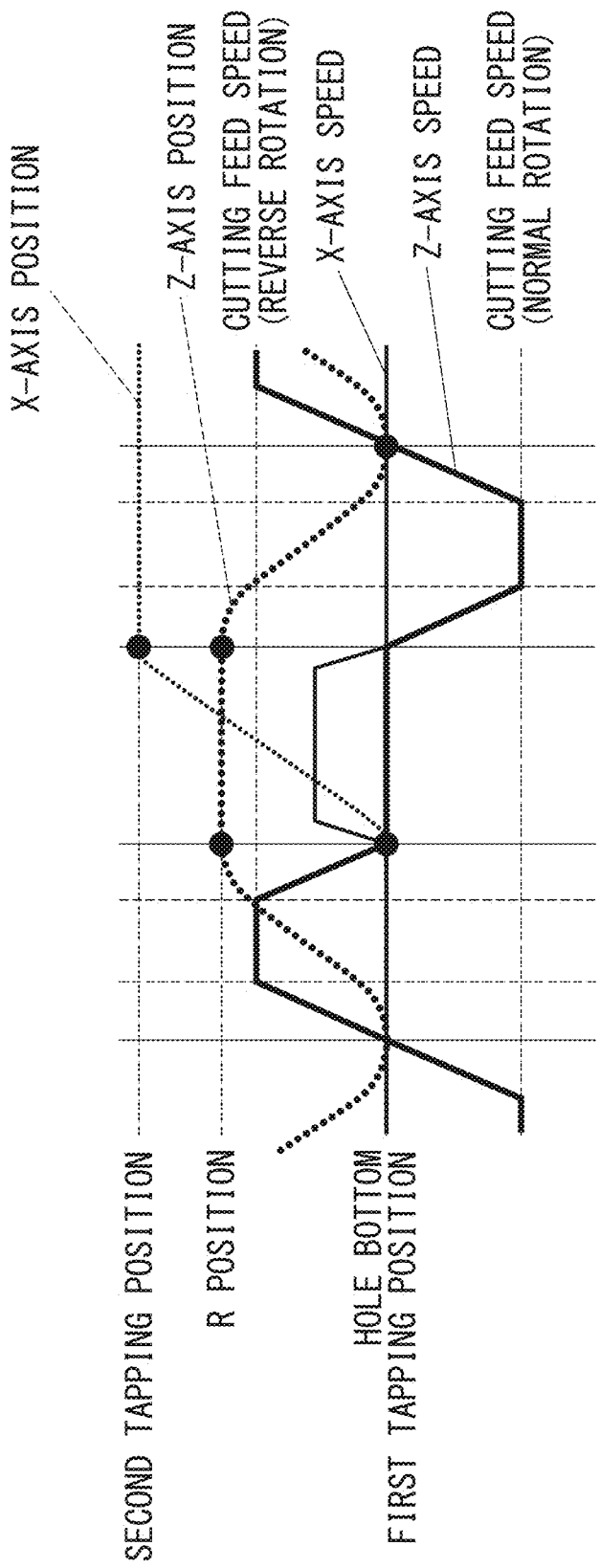
FIG. 8 is a graph illustrating temporal changes in the speed and position of the main shaft (Z axis) and the table (X axis) in a comparative example.

FIG. 8 illustrates a comparative example of the control method in the first control mode in FIG. 3, and FIG. 9 illustrates a comparative example of the control method in the second control mode in FIG. 4.

In FIG. 8, the positioning step S3 starts simultaneously with the end of the retracting step S2, and the tapping step S1 starts simultaneously with the end of the positioning step S3.

In FIG. 9, the main shaft 2 starts decelerating at the same time as when the distal end of the tool T passes the R position in the retracting step S2, and the main shaft 2 finishes accelerating at the same time as when the distal end of the tool T passes the R position in the tapping step S1.

Based on a comparison between FIG. 3 and FIG. 8 and a comparison between FIG. 4 and FIG. 9, it is clear that the cycle time is shortened in accordance with the first control mode and the second control mode in this embodiment.

The R position is set above the upper surface of the workpiece W, and the movement path of the distal end of the tool T is circular-arc-shaped or substantially circular-arc-shaped above the R position. Accordingly, the distal end of the tool T moving along the circular-arc-shaped or substantially circular-arc-shaped path can be prevented from interfering with the edges of the opening of the pilot hole H, regardless of variations in the thickness of the workpiece W.

In the above embodiment, the acceleration rate and the deceleration rate of the main shaft 2 in the Z direction between the R position and the R' position in the first control mode may be lower than the maximum acceleration rate and the maximum deceleration rate, respectively, within a range in which the cycle time does not increase.

In a case where the deceleration rate is lower than the maximum deceleration rate, the deceleration distance of the main shaft 2 increases. This causes the distance between the R position and the R' position in the Z direction to increase, so that the distal end of the tool T retracts to a higher position.

The amount of power consumed and the amount of heat generated by the Z-axis feed motor 5 during acceleration and deceleration increase with increasing acceleration rate and increasing deceleration rate. By reducing the acceleration rate and the deceleration rate of the main shaft 2, the amount of power consumed and the amount of heat generated by the Z-axis feed motor 5 can be reduced.

For example, in FIG. 2, there is a period in which the main shaft 2 moves linearly in the X direction relative to the table 3 between the tapping positions Pn and Pn+1. On the other hand, as shown in FIG. 7, even if the main shaft 2 decelerates at a reduced deceleration rate and the main shaft 2 subsequently starts accelerating immediately at a reduced acceleration rate, the cycle time is the same as that in FIG. 2.

Figure 7:
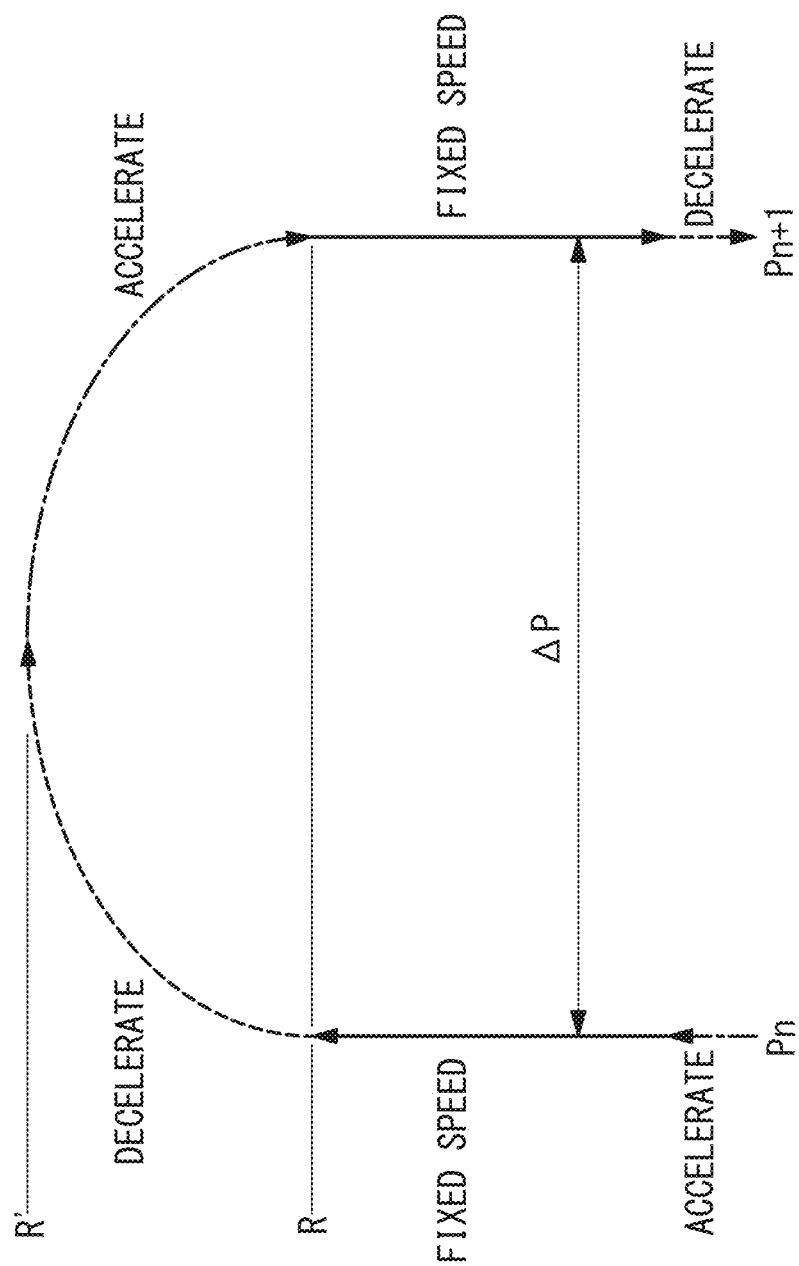
FIG. 7 illustrates a modification of the movement path of the tool relative to the workpiece and the moving speed of the tool in the first control mode.

For example, as shown in FIG. 7, the deceleration rate and the acceleration rate between the R position and the R' position are set such that the movement path of the tool T relative to the workpiece W between the R position and the R' position is a smooth, circular-arc-shaped or substantially circular-arc-shaped curve having no straight lines. Accordingly, the moving speed of the main shaft 2 between deceleration and acceleration is changed as moderately as possible within a range in which the cycle time is not extended, so that the amount of power consumed and the amount of heat generated by the Z-axis feed motor 5 can be reduced more effectively.

As an alternative to the above embodiment in which the second direction is the X direction, the second direction may be any direction that is orthogonal to the Z direction. Specifically, the second direction may be the Y direction, or may be both the X and Y directions.

For example, in a case where the plurality of tapping positions Pi are arranged in the Y direction, the control unit 7b may control a Y-axis feed motor (second feed motor) to move the table 3 in the Y direction in the positioning step S3.

As another example, in a case where the plurality of tapping positions Pi are arranged two-dimensionally in the X direction and the Y direction, the control unit 7b may simultaneously control both the X-axis feed motor 6 and the Y-axis feed motor to move the table 3 in both the X direction and the Y direction in the positioning step S3.

As an alternative to the above embodiment in which the table 3 moves in the X and Y directions that intersect the longitudinal axis of the main shaft 2, the relative movement of the main shaft 2 and the table 3 in the X and Y directions may be achieved by the movement of one of or both of the main shaft 2 and the table 3. Likewise, as an alternative to the above embodiment in which the main shaft 2 moves in the Z direction that is parallel to the longitudinal axis of the main shaft 2, the relative movement of the main shaft 2 and the table 3 in the Z direction may be achieved by the movement of one of or both of the main shaft 2 and the table 3.

For example, in place of the feed motors 5 and 6, a first feed motor that moves the table 3 in the Z direction and a second feed motor that moves the main shaft 2 in the X and Y directions may be provided.

As an alternative to the above embodiment in which the first direction is the vertical direction (Z direction) and the second direction is the horizontal direction (X direction and Y direction), the specific directions of the first direction and the second direction are changeable, where appropriate, depending on the specifications of the machining device. For example, in a case of a machining device in which the main shaft 2 is horizontally disposed, the first direction is the horizontal direction, and the second direction is any direction that intersects the first direction.

REFERENCE SIGNS LIST 1 machining device
2 main shaft
3 table
4 main shaft motor
5 Z-axis feed motor (first feed motor)
6 X-axis feed motor (second feed motor)
7b control unit
H pilot hole Pn, Pn+1 tapping position
R' retracted position
R reference position
T tool
W workpiece

The invention claimed is:

1. A controller for a machining device, the machining device including a table that holds a workpiece, a main shaft that holds a tapping tool, a first feed motor that relatively moves the table and the main shaft in a first direction parallel to a longitudinal axis of the main shaft, a second feed motor that relatively moves the table and the main shaft in a second direction intersecting the longitudinal axis, and a main shaft motor that rotates the main shaft around the longitudinal axis, the controller comprising:
a control unit that controls the first feed motor to move a distal end of the tool between a retracted position where the distal end of the tool is retracted from the workpiece and a predetermined depth position in the workpiece, controls the second feed motor to position each of a plurality of tapping positions of the workpiece relative to the tool, and controls the main shaft motor to control rotation of the tool,
wherein the control unit sequentially repeats
a tapping step of performing tapping at one of the tapping positions by moving the distal end of the tool from the retracted position to the predetermined depth position while rotating the tool in a normal direction,
a retracting step of retracting the tool from the workpiece by moving the distal end of the tool from the predetermined depth position to the retracted position without stopping while rotating the tool in a reverse direction, and
a positioning step of positioning a subsequent one of the tapping positions relative to the tool and switching a rotational direction of the tool from the reverse direction to the normal direction, and
wherein the control unit further performs a process including
starting relative movement of the workpiece and the tool in the positioning step at the same time as when the distal end of the tool passes a reference position between the workpiece and the retracted position in the retracting step,
completing the relative movement of the workpiece and the tool in the positioning step at the same time as when the distal end of the tool passes the reference position in the tapping step, and
controlling a timing at which acceleration of the relative movement of the workpiece and the tool finishes in the tapping step and a timing at which deceleration of the relative movement of the workpiece and the tool starts in the retracting step based on a distance from the one tapping position to the subsequent tapping position in the second direction.

2. The controller according to claim 1,
wherein, in the tapping step and the retracting step, the control unit increases a relative speed of the workpiece and the tool in the first direction to a cutting feed speed, relatively moves the workpiece and the tool at the cutting feed speed, and decreases the relative speed of the workpiece and the tool in the first direction from the cutting feed speed.

3. The controller according to claim 1,
wherein, in a case where a total of a length of an acceleration period in the tapping step and a length of a deceleration period in the retracting step is smaller than or equal to a length of a positioning period in the positioning step, the control unit performs a process including
causing the relative speed of the workpiece and the tool in the first direction to start decreasing at the same time as when the distal end of the tool passes the reference position in the retracting step, and
causing the relative speed of the workpiece and the tool in the first direction to finish increasing at the same time as when the distal end of the tool passes the reference position in the tapping step.

4. The controller according to claim 3,
wherein the control unit sets an acceleration rate of the workpiece and the tool in the first direction in the tapping step and a deceleration rate of the workpiece and the tool in the first direction in the retracting step to be lower than a maximum acceleration rate and a maximum deceleration rate, respectively, within a range in which a cycle time does not increase.

5. The controller according to claim 1,
wherein, in a case where a total of a length of an acceleration period in the tapping step and a length of a deceleration period in the retracting step is greater than a length of a positioning period in the positioning step, the control unit performs a process including
causing the relative speed of the workpiece and the tool in the first direction to start decreasing before the distal end of the tool passes the reference position in the retracting step, and
causing the relative speed of the workpiece and the tool in the first direction to finish increasing after the distal end of the tool passes the reference position in the tapping step.

6. The controller according to claim 5,
wherein the control unit controls the timing at which the deceleration starts in the retracting step such that a length of a time period from when the distal end of the tool passes the reference position in the retracting step to when the distal end of the tool passes the reference position in the subsequent tapping step is equal to the length of the positioning period.

7. A control method for a machining device, the machining device including a table that holds a workpiece, a main shaft that holds a tapping tool, a first feed motor that relatively moves the table and the main shaft in a first direction parallel to a longitudinal axis of the main shaft, a second feed motor that relatively moves the table and the main shaft in a second direction intersecting the longitudinal axis, and a main shaft motor that rotates the main shaft around the longitudinal axis,
wherein the control method involves controlling the first feed motor to move a distal end of the tool between a retracted position where the distal end of the tool is retracted from the workpiece and a predetermined depth position in the workpiece, controlling the second feed motor to position each of a plurality of tapping positions of the workpiece relative to the tool, and controlling the main shaft motor to control rotation of the tool, the control method comprising:
a tapping step of performing tapping at one of the tapping positions by moving the distal end of the tool from the retracted position to the predetermined depth position while rotating the tool in a normal direction;
a retracting step of retracting the tool from the workpiece by moving the distal end of the tool from the predetermined depth position to the retracted position without stopping while rotating the tool in a reverse direction;

a positioning step of positioning a subsequent one of the tapping positions relative to the tool and switching a rotational direction of the tool from the reverse direction to the normal direction, the tapping step, the retracting step, and the positioning step being repeated sequentially;

a step of starting relative movement of the workpiece and the tool in the positioning step at the same time as when the distal end of the tool passes a reference position between the workpiece and the retracted position in the retracting step;

a step of completing the relative movement of the workpiece and the tool in the positioning step at the same time as when the distal end of the tool passes the reference position in the tapping step; and a step of controlling a timing at which acceleration of the relative movement of the workpiece and the tool finishes in the tapping step and a timing at which deceleration of the relative movement of the workpiece and the tool starts in the retracting step based on a distance from the one tapping position to the subsequent tapping position in the second direction.

* * * * *